United States Patent
Chauvier

(10) Patent No.: US 6,827,847 B1
(45) Date of Patent: Dec. 7, 2004

(54) SYSTEM AND ASSEMBLY FOR SANITIZING SWIMMING POOL WATER

(75) Inventor: Daniel J. U. D. Chauvier, Highland Beach, FL (US)

(73) Assignee: Polaris Pool Systems, Inc., Vista, CA (US)

(*) Notice: Subject to any disclaimer, the term of this patent is extended or adjusted under 35 U.S.C. 154(b) by 0 days.

(21) Appl. No.: 10/228,397

(22) Filed: Aug. 27, 2002

Related U.S. Application Data

(60) Provisional application No. 60/315,103, filed on Aug. 27, 2001.

(51) Int. Cl.$^7$ .............................. C02F 1/461; C25B 1/26
(52) U.S. Cl. ....................... 210/138; 210/169; 210/192; 210/206; 210/259; 210/416.2; 210/748
(58) Field of Search .................................. 210/136, 169, 210/192, 198.1, 205, 206, 252, 259, 416.1, 748, 416.2; 204/262, 630

(56) References Cited

U.S. PATENT DOCUMENTS

| | | | | |
|---|---|---|---|---|
| 4,229,272 A | * | 10/1980 | Yates | 205/620 |
| 4,250,126 A | * | 2/1981 | Yates | 261/70 |
| 4,508,687 A | * | 4/1985 | Houghton | 422/276 |
| 4,935,116 A | * | 6/1990 | LeMire | 204/237 |
| 5,228,964 A | * | 7/1993 | Middleby | 204/194 |
| 5,326,443 A | * | 7/1994 | Hilbig | 210/97 |
| 6,471,873 B1 | * | 10/2002 | Greenberg et al. | 210/748 |

FOREIGN PATENT DOCUMENTS

DE       2934583    *  3/1981

* cited by examiner

*Primary Examiner*—Fred G. Prince
(74) *Attorney, Agent, or Firm*—Malloy & Malloy, P.A.

(57) ABSTRACT

A system and assembly for treating swimming pool water including an electrolytic chlorine generator assembly and a pass of ionization filter collectively mounted in a common cartridge replaceable disposed in the circulating system of the swimming pool and collectively disposed and structured in fluid communication with a path of water flow passing through the housing such that the water is sanitized prior to being returned to the swimming pool. The chlorine generator is structured to release chlorine from the pool water passing through the housing which has a predetermined concentration of salt added directly to the main body of water within the swimming pool.

9 Claims, 2 Drawing Sheets

SYSTEM AND ASSEMBLY FOR SANITIZING SWIMMING POOL WATER

CLAIM OF PRIORITY

The present application is based on and a claim to priority is made under 35 U.S.C. Section 119(e) to provisional patent application currently pending in the U.S. Patent and Trademark Office having Ser. No. 60/315,103 and a filing date of Aug. 27, 2001.

BACKGROUND OF THE INVENTION

1. Field of the Invention

This invention is directed to a system and assembly for purifying/sanitizing the water of a swimming pool utilizing a chlorine generator and a ionization mineral filter collectively structured as a replaceable, unitary assembly.

2. Description of the Related Art

It is universally recognized that the proper maintenance of swimming pools, regardless of their size or location, is a continuous procedure. In addition to the physical cleaning of both the submerged and exposed surfaces of the swimming pool, it is necessary to maintain water purity in order to ensure that the use of the swimming pool does not present health hazards. Accordingly, it is important to have a reliable maintenance system for purifying water within the swimming pool. As with most maintenance procedures both cost and reliability are major concerns. In many situations involving conventional systems and apparatus for treating the swimming pool water, the water is purified to remove microorganisms, such as bacteria or algae. In addition, harmful metal ions, such as mercury and lead are also removed.

Typically, conventional water maintenance and purifying systems have been known to include mineral filters having a variety of structural configurations, which are specifically directed to remove the aforementioned potential a harmful metal ions. However, the control of bacterial growth in the swimming pool water has presented more complex problems normally addressed by the adding of chemicals such as chlorine. Water treatment also involves the concurrent determination and regulation of the ph level of the water once such purifying chemicals have been added.

While large public or private swimming pools may include stored chlorine gas systems which allow the controlled addition of gaseous chlorine into the pool water, more common residential size swimming pools do not justify the expensive installation and relatively complex operation of such systems. Accordingly, smaller swimming pools typically rely on the manual addition of purifying chemicals, primarily chlorine compounds, in liquid, tablet or granulated particle form. Normally, the chlorine chemical additives are supplied to the swimming pool by periodically adding a fresh supply of the purifying chemical directly to the pool water. As such, a wide variation in the concentration level of the chlorine, once dissolved in the pool water, would develop. Precise regulation of the chlorine level using this method is difficult and often results in equally imprecise or inconsistent control of bacterial growth.

Further, dependent upon the weather, amount of pool use and a variety of other factors, the quantity and frequency of chlorine addition varies. Therefore, while the rate of growth of bacteria and like organic contaminants is generally restricted, the person maintaining the pool is required to monitor the chlorine level at frequent intervals in order to detect when the addition of chlorine was required.

In addition, it is recognized in the pool maintenance industry that the aforementioned mineral filters would gradually become less effective, over a period of time, in removing the contaminant metal ions. While such filters also have the effect of facilitating the purification of the swimming pool water in terms of controlling bacterial growth, it is recognized that more and more chlorine, or other purifying chemical compounds need to be added as the effectiveness of the ionization mineral filters become less and less effective.

One recognized solution to the above problems, was the development and use of chlorine generators. Most commonly, chlorine generators are present in the form of electrolytic chlorinators which operate by electrolyzing a sodium chloride solution through the provision of both an anode chamber and a cathode chamber. The construction of such electrolytic chlorinators typically involves the releasing of chlorine gas by electrolyzing a sodium chloride solution within the anode chamber. In this recognized procedure, positively charged 'sodium ions were attracted to the negatively charged cathode thereby serving to liberate the chlorine gas within the anode chamber. The chlorine gas was then released into the swimming pool water in a variety of different ways. Further, in the conventional structural configuration of known electrolytic chlorine generators the anode and cathode chambers are separated from one another by an ion-permeable barrier. This barrier prevents the chlorine gas, liberated within the anode chamber, from mixing with the hydrogen gas, liberated within the cathode chamber. As such brine in the form of the sodium chloride solution was separated from the resulting sodium hydroxide, which is caustic and forms within the cathode chamber.

Regardless of the specific structure and design of known electrolytic chlorine generators, they are frequently considered to be a permanent or at least semi-permanent part of the circulation system associated with the vast majority of swimming pools with which they are used. Similarly, the aforementioned ionization mineral filters are constructed and installed as distinct and separate units, frequently located at the water supply inlet to the swimming pool filtration system or at other convenient locations. As a result, there is no cooperative effort between the respective operations of the mineral filter and the chlorine generator. As a result of such independent operation, the chlorine generator would frequently be required to produce more chlorine as the mineral filter became less effective in order to adequately control the growth of organic contaminants, of the type set forth above.

In addition to the permanently installed nature of most conventional chlorine generators, there existed the problem of providing a brine or sodium chloride solution of proper concentration to the anode side of the chlorine generator in order to produce an adequate amount of chlorine gas. In an attempt to overcome such problems a variety of different structures were designed which were specifically intended to create a properly concentrated sodium chloride solution to the electrolytic plates of the generator. Also such prior art attempts involved the addition of a predetermined quantity of undissolved sodium chloride, such as in the form of rock salt, directly to the interior of the chlorine generator so as to create a properly concentrated brine solution which was eventually fed to the anode chamber of the chlorine generator.

Other prior art attempts involve the provision of a separate "briner", chamber or device which accomplished the continuous dissolving of sodium chloride in order to deliver a brine, of proper concentration, to the anode chamber of the chlorine generator. While such attempts to provide a sodium chloride solution may be considered to be at least minimally operable, their operation resulted in a variety of different problems associated with the collection or built-up of salt deposits on certain portions of the electrolytic generator thereby harmfully affecting its performance.

Therefore, there is a recognized need in the swimming pool servicing industry for an effective and efficient system and associated structure for simplifying purification/sanitization of swimming pool water by effectively controlling both the mineral and organic contaminants found in swimming pool water. Such an improved system and assembly should incorporate the recognized benefits of both an ionization filter and electrolytic chlorine generator apparatus. In addition, these two complimentary water treating systems could be made to be extremely cost effective to the extent of allowing a unitized assembly including both of the devices to be periodically replaceable, depending upon the usage, weather, environment, etc. associated with the swimming pool. Further, once installed a combined electrolytic chlorine generator and ionization mineral filter would be cooperatively structured to include a substantially equal operable life. Removal and replacement of a water treatment cartridge or housing, containing both of the devices therein, would be justified from a cost stand point.

SUMMARY OF THE INVENTION

The present invention is directed to a system and assembly for purifying and/or sanitizing the water of a swimming pool by inhibiting growth and otherwise regulating the existence of both mineral and organic contaminants. As is well recognized contaminants of the type set forth above include mineral contaminants such as potentially harmful ions including mercury, lead, etc. The aforementioned organic contaminants include bacteria, algae, etc. The former group of contaminants may best be removed or controlled by an ionization process, wherein the latter group of organic contaminants may best be controlled through the addition of purifying chemicals, including chlorine, bromine, etc, to the swimming pool water.

Accordingly, the present invention comprises utilization of a chlorine generator in combination with a mineral filter wherein contaminants of both the aforementioned groups are controlled, thereby rendering the pool water safe for use. In addition, purification of the swimming pool part can be accomplished in an extremely economical manner by incorporating the water treatment system and assembly of the present invention and facilitate adequate maintenance of the pool water in a manner which significantly reduces the amount of time required.

More specifically, the present invention comprises a housing incorporated within the circulation system which is preferably, but not necessarily, disposed-on a water outlet side of the circulation pump facilities which serves to remove and add the water to the main body of the swimming pool. The housing includes a water inlet and water outlet and is structured to define a path of water flow there through between the inlet and outlet. Two structural features of the present invention are the complimentary structuring of the housing and/or a canister to include a chlorine generator and an ionization filter at least partially mounted therein. A unitary assembly comprising the chlorine generator and mineral filter is thereby defined.

In at least one preferred embodiment of the present invention, the chlorine generator may be more specifically defined as an electrolytic chlorinating device incorporating appropriately structured and relatively disposed anode and cathode electrolytic plates. As is well known, the chlorine generator is structured to react with a brine or salt solution so as to release a chlorine gas which is then infused into the path of water flow passing through the housing and outwardly therefrom to the water return for the main body of the swimming pool. The electrolytic chlorinating assembly may of course assume a variety of structural configurations in order to perform intended electrolysis as generally described above.

However, one at least partially distinguishing structural feature of the system and assembly of the present invention is the elimination of any "briner" or segmented chamber or compartment for the containment of yet undissolved salt (NaCl) as is typically found in conventional electrolytic chlorine generators. To the contrary, the present invention comprises the adding of a predetermined quantity of salt to the main body of water of the swimming pool. The quantity of NaCl added is sufficient to effectively facilitate the electrolysis procedure of the chlorine generator and the release of the appropriate amount of the chlorine gas. By way of example, a preferred concentration of sodium chloride would be substantially equal to approximately one tea-spoon for each gallon of water contained within the main body of water of the swimming pool. The size of the average residential swimming pool being generally between ten thousand to thirty thousand gallons would require some 300 to 350 pounds of salt to be added directly to the main body of water within the swimming pool. While this quantity may initially appear to be somewhat large, it must be understood that the adding of salt may only be required once or twice a year. This amount of salt would not affect the main body of water of the swimming pool to the extent to be noticed by users of the pool. Obviously, the quantity of salt to be added on a predetermined, periodic basis would be based on the size or quantity of the water within the main body of the pool, weather conditions including sun light to which the pool is exposed, the frequency of pool usage and a variety of other factors.

As set forth above, the unitary structural configuration incorporates both of the above described purification/sanitation devices defined by the electrolytic chlorination assembly and the mineral filter. As such, in at least one preferred embodiment of the present invention the mineral filter is more specifically defined as a passive ionization filter which serves to de-ionize or remove potentially harmful metal ions such as mercury and lead from the flow of water passing through the housing and/or canister. In accomplishing the passive of ionization process, metals such as copper, zinc, etc. is maintained in preferably spaced relation to the electrolytic chlorination assembly, but within the same canister or housing and in direct fluid communication with the path of water flow passing there through. Passive de-ionization occurs by virtue of the preferred unitary construction resulting in the mineral contaminants, in the form of the undesirable metal ions, being removed.

One additional advantage of the aforementioned complimentary unitary configuration of both purifying devices in in a common housing or cartridge is the ability to structure both of the aforementioned purifying devices to have a substantially common operable life. This in turn facilitates the removable, replaceable installation of the water treatment assembly of the present invention in the circulation system of virtually any swimming pool facility. More specifically, it is well accepted that known ionization filters will, over a period of time become less and less effective. This normally results in an increased amount of chlorine which must be added to the pool water in order to control the unwanted contaminants therein.

Therefore, cost of the entire purification assembly is greatly reduced by the structuring of each of the electrolytic chlorination assembly and the passive ionization mineral filter to have a substantially common operable life. When such predetermined operable life expires, the entire housing-cartridge-is removed from the circulation system of the swimming pool assembly and disposed of. Replacement of a new cartridge is cost effective due, at least in part, to the fact that each of the electrolytic chlorination assembly and passive ionization mineral filter can be manufactured at a considerable cost savings, once it is determined that each has a substantially common operable life. The predetermined operable life can of course vary but, by way of example only, each of the aforementioned water treatment devices may be intended to operate for approximately a six month period. Replacement of the cartridge/housing after the expiration of the operable life thereby assures continuous control of the unwanted contaminants while minimizing the time which must be spent on water purification/sanitization and other maintenance procedures of the swimming pool facility.

Other structural features which enhance both the efficient operation and convenience of use may include a diagnostic facility incorporated within the assembly and system of the present invention which serves to measure the salt concentration in order to insure that the pool water maintain at least a minimal sodium chloride concentration. Also, the water treatment assembly of the present invention, and in particular the electrolytic plates associated with the chlorine generator may be structured to be self cleaning by utilizing a reverse polarity mechanism.

Yet another feature of the present invention is the provision of a control mechanism which is time dependent and which can be programmed to operate both the circulation system of the swimming pool facility as well as the concurrent operation of the water treatment assembly, including operation of both the electrolytic chlorination assembly and the passive ionization mineral filter.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
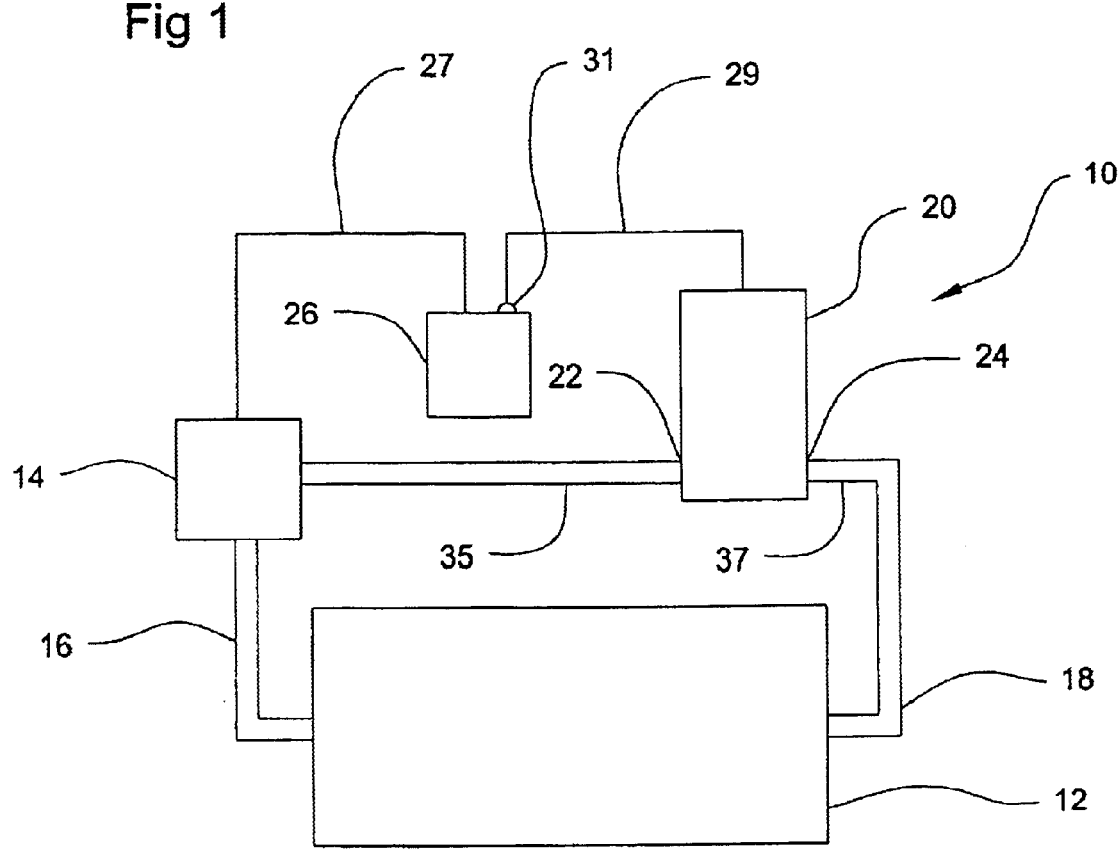
FIG. 1 is a schematic representation of the water treatment assembly and system of the present invention incorporated within the circulation system of a conventional swimming pool facility.

As shown in the accompanying drawings, the present invention is directed to a system and associated assembly for the purification and/or sanitation of swimming pool water. For purposes of clarity FIG. 1 is a schematic representation of a swimming pool facility, generally indicated as 10 and incorporating a swimming pool 12. The swimming pool 12 may be of a plurality of different sizes and include a water circulation assembly including a pump facility 14. The circulation pump 14 serves to remove water from the swimming pool 12 as at 16 and, after the treatment thereof for the removal and/or control of both mineral and organic contaminants, the water is returned to the swimming pool 12 as at 18.

More specifically, the present invention includes a water treatment assembly generally indicated as 20 having a water inlet 22 and a water outlet 24 serving to receive and return the pool water, as part of the circulation system. As will also be explained in greater detail hereinafter, the system and assembly of the present invention includes a controller 26 which may be powered from a conventional electrical supply source (not shown). The controller 26 is time dependent and structured to control the time and duration of operation of the circulation pump 14 as well as the time and duration of operation of the water treatment assembly 20. Therefore, the water treatment assembly 20 may be scheduled to operate concurrently during the intended, pre-programed time periods of operation of the pump and circulation system. Controlling of the time and duration of operation of the water treatment assembly 20 is established by regulating current flow, through appropriate conductors 27, between the controller 26 and the circulating pump 14. Similarly, a somewhat conventional electrical conductor 29 establishes an electric connection between the controller 26 and the water treatment assembly 20. As will be more fully explained, the conductor 29 may include a removable plug-in connector as at 31. The conductor 29 and the plug-in connector 31 may be considered a part of the water treating assembly 20 and may be replaced or removed therewith as required.

Figure 2:
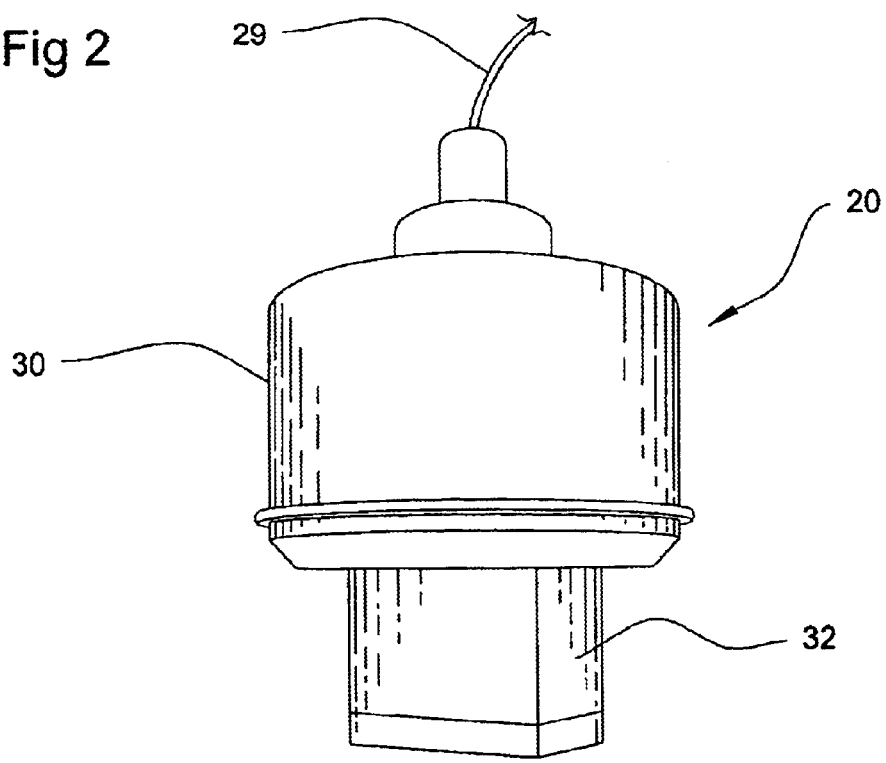
FIG. 2 is an exterior view in perspective of one embodiment of a housing and/or canister comprising a unitary assembly for the operative components of the water treatment assembly of the present invention.
Figure 3:
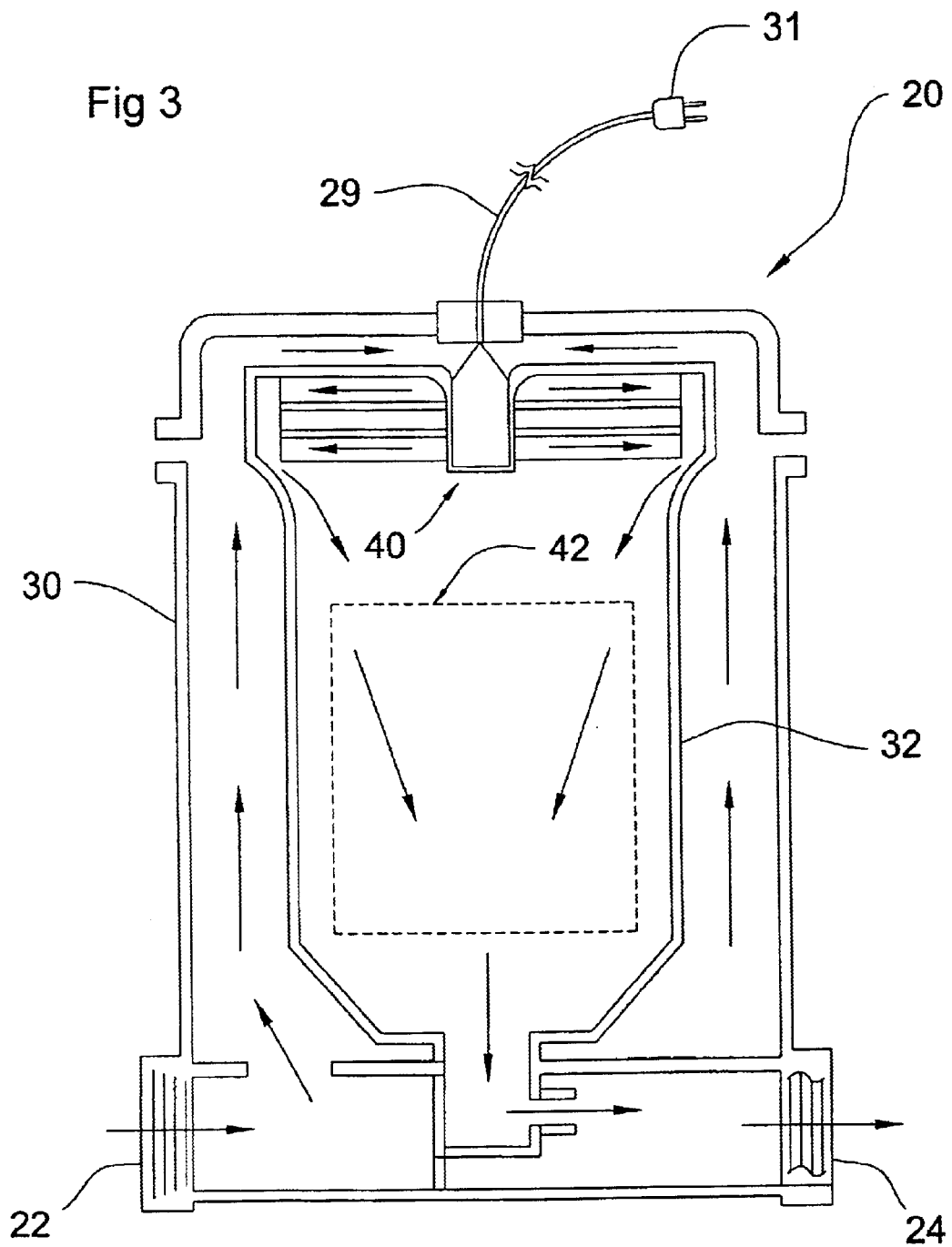
FIG. 3 is a schematic representation of the interior of the housing/canister of the embodiment of FIG. 2 including both a chlorine generator in the form of an electrolytic chlorination assembly and a mineral filter in the form of a passive ionization device.

With reference to FIGS. 2 and 3, the water treating assembly 20, in at least one preferred embodiment, includes a housing 30 having an at least partially hollow interior. A canister structure 32 is mounted at least partially within the housing 30, wherein the relative dimensions and structural configurations of the housing 30 and the canister 32 may vary. As set forth above, the electrical conductor 29 may enter the housing 30 and be connected to the canister 32 as best shown in FIG. 3 and may be considered a part thereof. As such, removal and/or replacement of the housing 30 and/or canister 32 may include the removal of the attached conductor 29 and plug 31. These structural features facilitate the convenient use of the water treating assembly 20, by a user thereof. Accordingly, when it is desired or required to replace the housing 30 it is simply disconnected from the circulating system by "unplugging" the connector or plug 31 and conductor 29 from the controller 26. Appropriate conduits 35 and 37 are also disconnected from the inlet and outlet 22 and 24 respectively of the housing 30 and/or canister 32.

FIG. 3 represents a schematic representation of the combined housing 30 and canister 32 and their relation to one another. It is of course noted that the specific structural configuration between the housing/canister 30, 32 of FIGS. 2 and 3 may vary. This further emphasizes the versatility of the water treatment system and assembly of the present invention in assuming any of a variety of different structural configurations. The water treating assembly 20 is therefore adaptable to a variety of different swimming pool facilities 10, regardless of the specific arrangement of the various components defining the circulation and/or filtration system thereof, as represented in basic form in FIG. 1.

As set forth above, the water treating assembly 20 is preferably located on the return side of circulating pump 14 relative to the flow of pool water back into the main body of water of the swimming pool 12. As such, water enters the housing 30 and canister 32 through inlet 22 and, after treatment, exits the outlet 24 on its return through appropriate return conduit 18 back into the swimming pool 12. The housing 30 and the cooperative structuring of the canister 32 is such as to define a path of water flow there through which is generally outlined by the plurality of directional arrows schematically included in FIG. 3.

Accordingly, one feature of the present invention is the combined, complimentary and unitary structuring of a chlorine generator generally indicated as 40 and a mineral filter generally indicated as 42. This complimentary, unitary structural configuration can be more specifically defined by the mounting of both the chlorine generator 40 and the mineral filter 42 in the same canister 32 and/or housing 30.

So as to effectively operate, the chlorine generator 40 comprises an electrolytic chlorination assembly comprising cooperatively disposed cathode and anode electrolytic plates and appropriately defined cathode and anode chambers. The water entering the inlet 22 passes along the aforementioned path of water flow, into and through the electrolytic chlorination assembly of the chlorine generator 40. An electrical current of the appropriate polarity is supplied by the conduit 29 and connector plug 31 being attached to the controller 26 which, as set forth above is powered from a conventional electrical power source. In order to liberate or release an appropriate quantity chlorine gas, and thereby control or regulate the growth of the organic contaminants, the pool water entering through inlet 22 is first supplied with predetermined quantity of salt or sodium chloride, NaCl. The sodium chloride is added directly to the body of water maintained within the swimming pool 12 in sufficient quantity to provide a predetermined concentration of NaCl to the entire water flow passing through the circulation system of FIG. 1 as well as the water entering water inlet 22 of the housing 30. Having the appropriate salt concentration thereby serves to assure release of chlorine gas from the dissolved NaCl. The released chlorine gas is then infused within the pool water passing through the housing along the aforementioned path of water flow.

In addition, the water thereafter is subjected to a mineral filter 42. In at least one preferred embodiment the mineral filter 42 comprises a passive ionization filter incorporating a plurality of metals such as, but not limited to, copper, zinc, etc. This material is disposed in interruptive and direct communicating relation with the path of water flow. Accordingly, the pool water prior to its exit from outlet 24 and its return to the swimming pool 12 is treated to the extent of adding an organic contaminant inhibiting agent, such as chlorine and at the same time has the mineral contaminants eliminated or reduced to acceptable levels through the passive ionization filter.

It is emphasized that the direction of water flow through is the housing 30 may be in an opposite direction from that represented in FIG. 3. As such the pool water passing through the housing 30 may first encounter the mineral filter 42 and thereafter be exposed to the chlorine generator 40.

Therefore, one distinct advantage of the water treating assembly and system of the present invention is the ability to cooperatively structure both the chlorine generator 40 and the passive ionization mineral filter 42 in a manner which assures a substantially common operable life or period of operation. As set forth above, ionization filters typically used in swimming pool facilities have a predictable life, in terms of effectively removing or limiting the mineral contaminants within the swimming pool water. Accordingly, the mineral filter 42 may be structured to have a predetermined operable life span. Cooperatively, the chlorine generator 40, and in particular the electrolytic plates associated therewith, may be structured to have a substantially equal operable life. A significant cost savings can result by reducing the relatively expensive material, such as, but not limited to titanium or titanium coatings used o in the manufacture of the electrolytic plates, or other components of the chlorine generator, so as to coincide the length of operation of the electrolytic chlorination assembly with that of the passive ionization filter 40 and 42 respectively.

Periodic removal, disposal and replacement of the housing/cartridge 30, 32 will be cost effective due to the fact that both the chlorine generator 40 and the mineral filter 42 are designed and structured to expire at substantially the same time. The cost of materials and other structural components of either the chlorine generator 40 or the mineral filter 42 will therefore not be wasted, such as if one of these components was structured to last longer than the other. In addition, a minimal amount of time by the user or maintenance personnel will be spent on maintaining the swimming pool water due to the fact that the water treatment assembly 20 and more particularly the housing 30 and/or canister 32 may be simply and quickly removed from the circulation system of the swimming pool facility 10 for disposal. The cost of the water treatment assembly 20 is such that it can be replaced periodically such as, but not limited to once every six months.

As set forth above, numerous other accessories and/or operative features may be included within the water treating assembly 20 of the present invention. Such additional features may comprise a diagnostic facility which is used to measure the concentration of NaCl in the water flow passing through the housing 30 and/or canister 32. The salt concentration within the pool water is thereby sufficient to assure the generation of adequate amounts of chlorine to accomplish the purification of the pool water.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A water treating assembly for a swimming pool, said assembly comprising:
   a) a housing including an inlet and an outlet and structured to establish a path of water flow there between,
   b) a chlorine generator comprising an electroytic chlorination assembly and a mineral filter positioned within said housing in fluid communication with said path of water flow,
   c) said chlorine generator and said mineral filter respectively structured and disposed to reduce contaminants within the water passing along said path of water flow and into the main body of the swimming pool,
   d) a control assembly electrically connected to a source of electrical energy and further connected in current regulating relation to said electrolytic chlorination assembly, e) said housing comprising a connecting assembly including a conductor structure electrically interconnecting said electrolytic chlorination assembly to said control assembly, and f) said housing, said chlorine generator, said mineral filter and said connecting assembly collectively and at least partially defining a disposable unit removably positionable in fluid communication with the swimming pool.

2. An assembly as recited in claim 1 wherein said chlorine generator is structured to react with water from the main body of the swimming pool having a predetermined concentration of NaCl.

3. An assembly as recited in claim 1 wherein said control assembly is time dependent and structured to direct electrical current to said electrolytic chlorination assembly during predetermined operational time periods.

4. An assembly as recited in claim 1 wherein said mineral filter comprises a passive ionization assembly disposed within said housing in fluid communication with said path of water flow.

5. An assembly as recited in claim 4 wherein at least one of said chlorine generator and mineral filter is structured to have an operable life of predetermined duration corresponding to the estimated operable life of the other of said chlorine generator or mineral filter.

6. An assembly as recited in claim 1 wherein either of said chlorine generator or said mineral filter is structured to have an operable life of predetermined duration dependent on an estimated operable life of the other of said chlorine generator and said mineral filter.

7. A system for sanitizing water within a swimming pool, said system comprising:

a) a housing including an inlet and an outlet, said housing structured to establish a path of water flow between said inlet and said outlet, b) an electrolytic chlorination assembly structured to release chlorine from pool water having a predetermined concentration of NaCl, c) a passive ionization filter structured to remove contaminant metal ions from the pool water, d) both said electrolytic chlorination assembly and said ionization filter mounted within said housing in fluid communication with said path of water flow, and e) a predetermined quantity of NaCl added directly to a main body of water of the swimming pool, said predetermined quantity of NaCl sufficient to establish said predetermined concentration of NaCl in the pool water.

8. An system as recited in claim 7 wherein said predetermined concentration of NaCl is substantially one tea spoon for each gallon of water within said main body of water of the swimming pool.

9. A water treating assembly for a swimming pool, said assembly comprising:

a) a housing including an inlet and an outlet and structured to establish a path of water flow therebetween, b) a chlorine generator comprising an electrolytic chlorination assembly and a mineral filter comprising a passive ionization assembly, both said chlorine generator and said mineral filter positioned within said housing in communication with said path of water flow, c) a control assembly electrically connected to a source of electrical energy and further connected in current regulating relation to said electrolytic chlorination assembly, d) said housing further comprising a connecting assembly including a conductor structure electrically interconnecting said electrolytic chlorination assembly to said control assembly, e) said chlorine generator and said mineral filter respectively structured and disposed to reduce contaminants within the water passing along said path of water flow and into the main body of the swimming pool, and f) said chlorine generator and said mineral filter at least partially defining a disposable unit removably posisionable in fluid communication with the swimming pool.

* * * * *